United States Patent
Sunkavalli et al.

(10) Patent No.: US 8,933,734 B2
(45) Date of Patent: Jan. 13, 2015

(54) HIERARCHICAL GLOBAL CLOCK TREE

(71) Applicant: Achronix Semiconductor Corporation, Santa Clara, CA (US)

(72) Inventors: Ravi Sunkavalli, Milpitas, CA (US); Rahul Nimaiyar, Sunnyvale, CA (US); Ravi Kurlagunda, Fremont, CA (US); Vijay Bantval, Cherry Hill, NJ (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 14/159,869

(22) Filed: Jan. 21, 2014

(65) Prior Publication Data

US 2014/0201560 A1    Jul. 17, 2014

Related U.S. Application Data

(63) Continuation of application No. 12/559,040, filed on Sep. 14, 2009, now Pat. No. 8,638,138.

(51) Int. Cl.
*H03L 7/06* (2006.01)
*G06F 1/06* (2006.01)
*G06F 1/10* (2006.01)

(52) U.S. Cl.
CPC ... *G06F 1/06* (2013.01); *G06F 1/10* (2013.01)
USPC .......................................... 327/156; 327/147

(58) Field of Classification Search
USPC ................................................ 327/147, 156
See application file for complete search history.

(56) References Cited

U.S. PATENT DOCUMENTS

| | | | | |
|---|---|---|---|---|
| 4,282,493 A | * | 8/1981 | Moreau | 331/2 |
| 8,213,561 B2 | * | 7/2012 | Vlasenko et al. | 375/376 |
| 8,411,812 B2 | * | 4/2013 | Vlasenko et al. | 375/371 |
| 8,638,138 B2 | * | 1/2014 | Sunkavalli et al. | 327/156 |
| 2003/0197537 A1 | * | 10/2003 | Saint-Laurent | 327/165 |
| 2005/0001662 A1 | * | 1/2005 | Kizer et al. | 327/156 |
| 2005/0206416 A1 | * | 9/2005 | Kizer | 327/156 |
| 2005/0232218 A1 | * | 10/2005 | Edwards et al. | 370/347 |
| 2005/0280407 A1 | * | 12/2005 | Loke et al. | 324/76.54 |
| 2006/0006918 A1 | * | 1/2006 | Saint-Laurent | 327/295 |
| 2007/0011483 A1 | * | 1/2007 | Lin | 713/500 |
| 2008/0174347 A1 | * | 7/2008 | Oshima | 327/145 |
| 2008/0204092 A1 | * | 8/2008 | Moehlmann et al. | 327/156 |
| 2009/0045855 A1 | * | 2/2009 | Kuo et al. | 327/156 |
| 2009/0160508 A1 | * | 6/2009 | Masuda | 327/156 |

(Continued)

OTHER PUBLICATIONS

"U.S. Appl. No. 12/559,040, Non Final Office Action mailed May 24, 2013", 8 pgs.

(Continued)

*Primary Examiner* — Adam Houston
(74) *Attorney, Agent, or Firm* — Schwegman Lundberg & Woessner, P.A.

(57) ABSTRACT

Methods, systems, and circuits for forming and operating a global hierarchical clock tree are described. The global hierarchical clock tree may comprise a clock circuit that operates to provide clock signals to a core circuit surrounded by the clock circuit. The clock circuit may include two or more first and second clock generator modules to generate a first and a second set of clock signals, respectively. The first and second clock modules may be located so that the first set of clock signals experience approximately equal first latencies and the second set of clock signals experience approximately equal second latencies. Additional methods, systems, and circuits are disclosed.

19 Claims, 9 Drawing Sheets

(56) References Cited

U.S. PATENT DOCUMENTS

| | | | |
|---|---|---|---|
| 2010/0277210 A1* | 11/2010 | Wang et al. | 327/147 |
| 2011/0063000 A1* | 3/2011 | Sunkavalli et al. | 327/156 |
| 2011/0140745 A1* | 6/2011 | Buck et al. | 327/156 |
| 2011/0219208 A1* | 9/2011 | Asaad et al. | 712/12 |
| 2012/0079333 A1* | 3/2012 | Whetsel | 714/726 |
| 2012/0106264 A1* | 5/2012 | Chong et al. | 365/189.02 |
| 2013/0003483 A1* | 1/2013 | Vlasenko et al. | 365/230.02 |
| 2014/0201560 A1* | 7/2014 | Sunkavalli et al. | 713/502 |

OTHER PUBLICATIONS

"U.S. Appl. No. 12/559,040, Notice of Allowance mailed Sep. 18, 2013", 8 pgs.

"U.S. Appl. No. 12/559,040, Response filed Aug. 26, 2013 to Non Final Office Action mailed May 24, 2013", 8 pgs.

* cited by examiner

_US 8,933,734 B2_

HIERARCHICAL GLOBAL CLOCK TREE

This application is a continuation of U.S. patent application Ser. No. 12/559,040, filed on Sep. 14, 2009, which is incorporated herein by reference in its entirety.

BACKGROUND

Clock signals may play many roles in synchronous systems. For example, data movement in various elements of a synchronous circuit may be referenced by one or more clock signals. In some cases, a large, pipelined circuit may comprise numerous clocked elements such as latches, flip-flops, and the like. In others, a synchronous circuit may comprise one or more clock domains each operating at a different frequency. These are just a few of the uses of clock signals in synchronous systems.

BRIEF DESCRIPTION OF THE DRAWINGS

Some embodiments of the disclosed technology are illustrated by way of example and not limitation in the figures of the accompanying drawings in which.

DETAILED DESCRIPTION

Example methods, systems, and circuits related to forming and operating a global hierarchical clock tree will now be described. In the following description, numerous examples having example-specific details are set forth to provide an understanding of example embodiments. It will be evident, however, to one of ordinary skill in the art, after reading this disclosure, that the present examples may be practiced without these example-specific details, and/or with different combinations of the details than are given here. Thus, specific embodiments are given for the purpose of simplified explanation, and not limitation.

In many embodiments, synchronous circuits may comprise architectures that include a core circuit without any internal clock tree surrounded by a clock circuit that provides a clock signal at multiple clock ports (e.g., clock input/output (I/O) pads) located around the boundary of the core circuit. A clock signal generated by a clock generator at an arbitrary location on the clock circuit may travel unequal distances before reaching various ports of the core circuit. This may result in different ports receiving clock signals with different latencies. Many of the embodiments disclosed herein comprise a clock circuit with an architecture that lends itself to distributing clock signals generated by one or more clock generators in a balanced manner.

Figure 1:
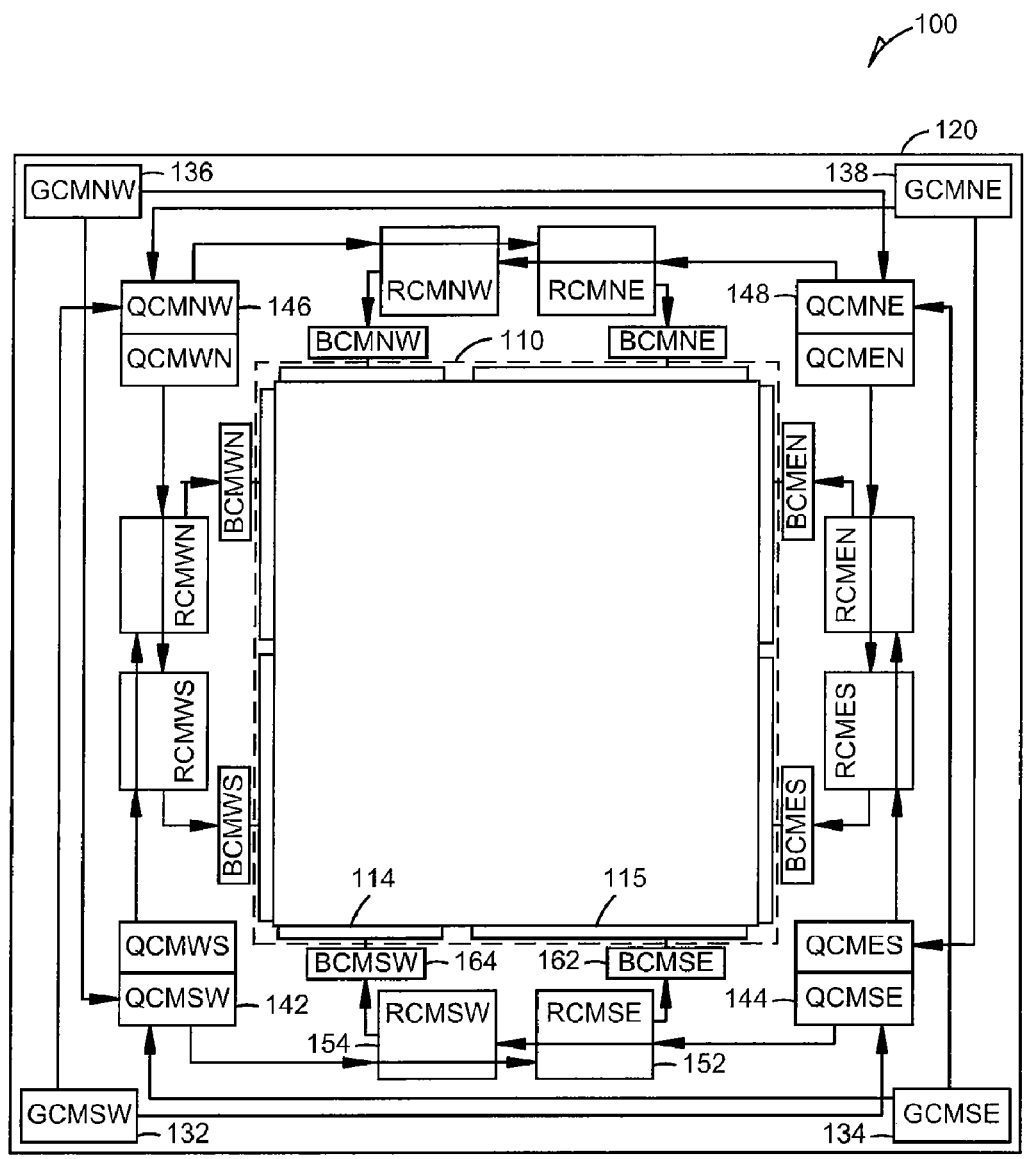
FIG. 1 is a diagram illustrating an architecture of a global hierarchical clock tree providing clock signals for a core circuit, according to various embodiments.

FIG. 1 is a diagram illustrating an architecture of a global hierarchical clock tree 100, providing clock signals for a core circuit 110, according to various embodiments. The architecture of the global hierarchical clock tree 100 may comprise a core circuit 110 and a clock circuit 120. The clock circuit 120 may provide latency balanced clock signals to input/output (I/O) ports of the core circuit 110. The core circuit 110, in an embodiment, may comprise an asynchronous circuit, such as an asynchronous field programmable gate array (FPGA). The core circuit 110 may lack any internal clock tree of its own.

In the embodiment shown in FIG. 1, clock generator modules 132, 134, 136, and 138 may be located, respectively, at south west (SW), south east (SE), north west (NW) and north east (NE) corners of the core circuit 110. Other embodiments may include a different number of clock generator modules, for example, two or three clock generator modules located at two or three corners of the core circuit 110. Still other embodiments may comprise a different architecture providing clock signals to ports of a core circuit with a different geometrical shape, such as a triangular or hexagonal shape.

In the embodiment shown in FIG. 1, each clock generator module (e.g., clock generator module 132) may provide clock signals to two first clock modules (e.g., first clock modules 144 and 146) located at approximately equal distances from the clock generator module (e.g., clock generator module 132). A first set of clock signals received by the first clock modules 144 and 146 originating from the clock generator module 132 travel approximately equal distances, and therefore experience approximately equal latencies. Similarly, the first set of clock signals received by the first clock modules 142 and 148 from clock generator modules 134 and 136 may also have approximately equal latencies. The first set of clock signals may comprise "global clock" signals, which may be destined for delivery as a "global clock" to the core circuit 110. Since features and behavior of the clock circuit 120 on four sides of the core circuit 110 are similar, only the portion on the South side (e.g., between the SW and SE corners) of the core circuit 110 will be described.

A second set of clock signals generated by the first clock modules 142 and 144 may be received by the second clock modules 152 and 154, respectively. The second clock modules 152 and 154 are located so that the second set of clock signals received by the second clock modules 152 and 154 from the first clock modules 142 and 144 travel approximately equal distances, therefore experiencing approximately equal latencies. Each of the second clock modules 152 and 154 may receive clock signals from one or more first clock modules (e.g., the first clock modules 142 and 144). At approximately equal distances from the second clock modules 152 and 154 are located third clock modules 162 and 164, which receive a third set of clock signals from the second clock modules 152 and 154, respectively. Therefore, the third set of clock signals received by the third clock modules 162 and 164 may travel approximately equal distances and have balanced latencies.

Using the third set of clock signals, the third clock modules 162 and 164 may generate a fourth set of clock signals with matched (i.e., approximately equal) latencies. The forth set of clock signals from the third clock modules 162 and 164 may be coupled to the input/output (I/O) ports of I/O banks 114 and 115 of the core circuit 110. Similar matched copies of the global clock signals may be generated by other portions of the clock circuit 120 and be coupled to other I/O ports of the core circuit 110.

Figure 2:
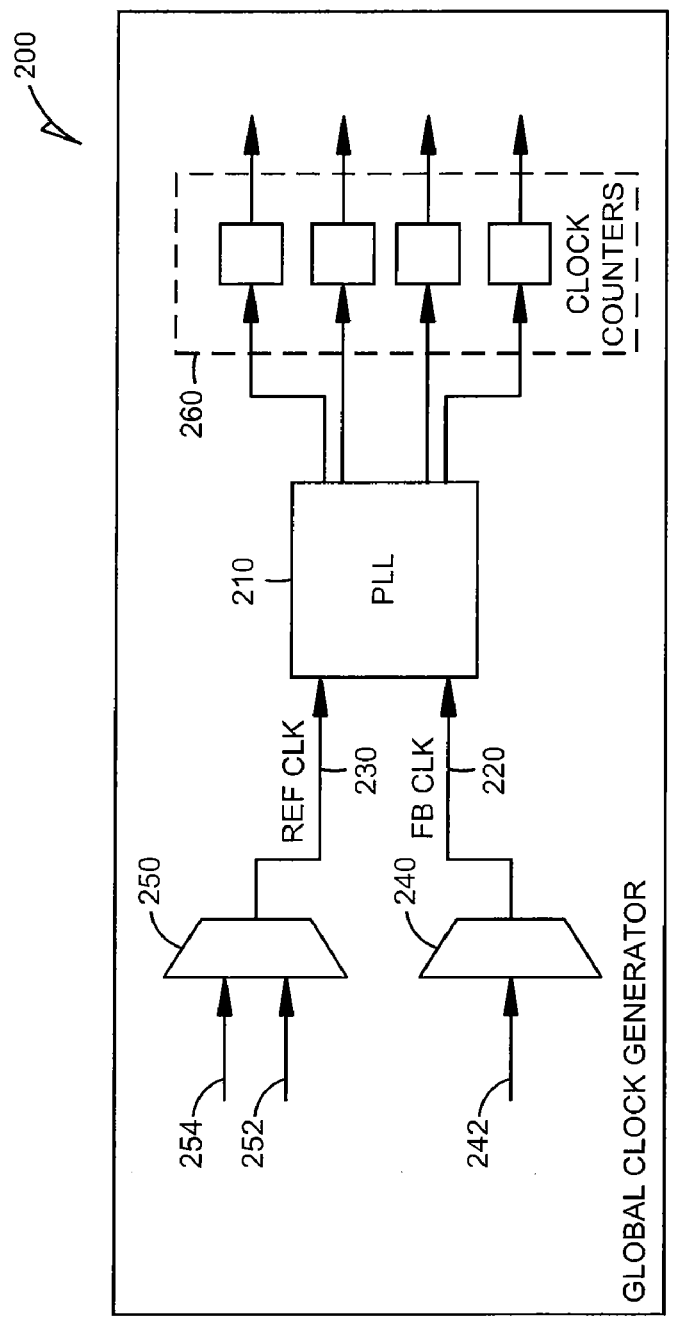
FIG. 2 is a diagram illustrating an example programmable global clock generator used in a clock circuit of FIG. 1, according to various embodiments.
Figure 3:
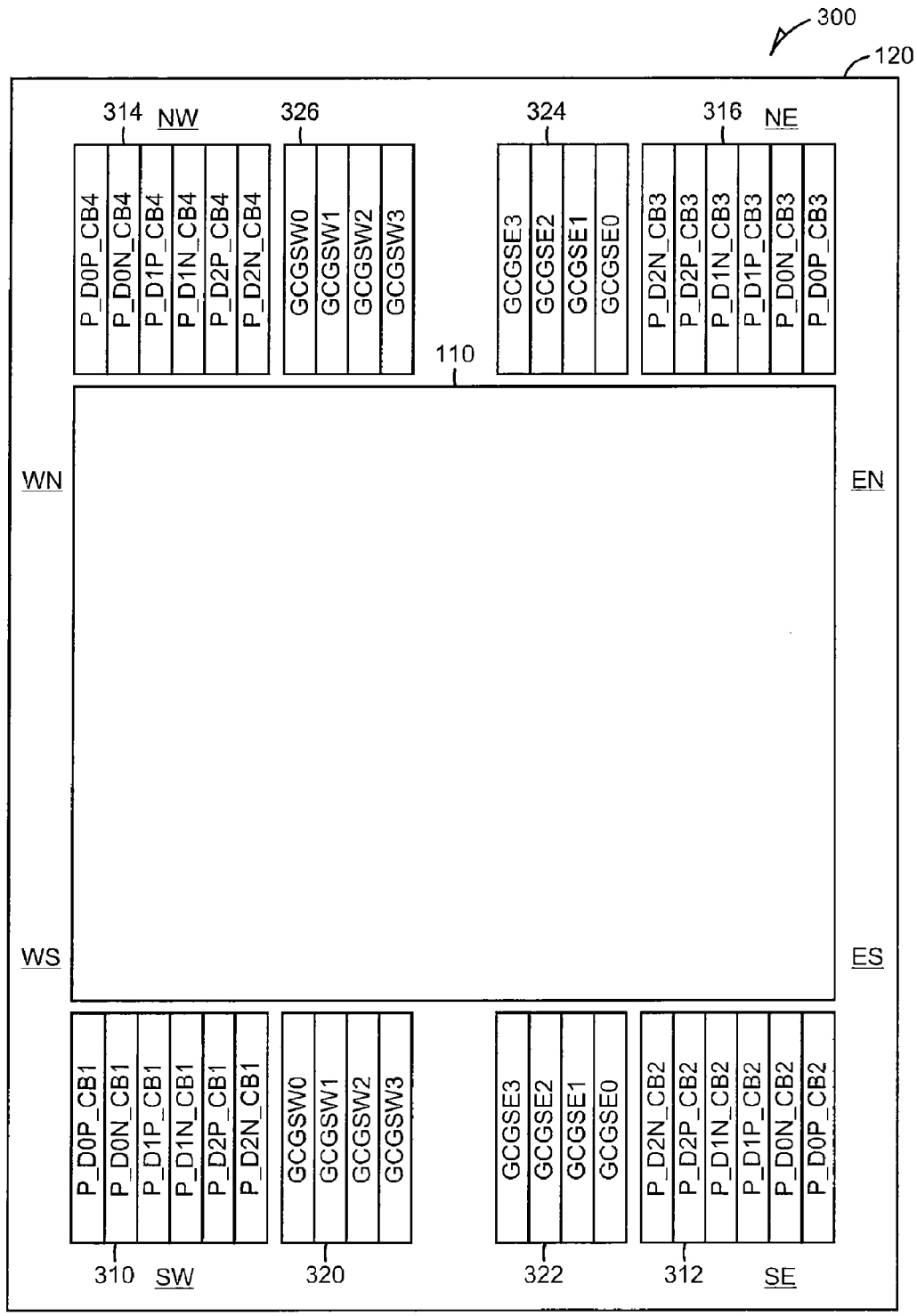
FIG. 3 is a diagram illustrating example locations of global clock generators and global clock buffers within the clock circuit of FIG. 1, according to various embodiments.

FIG. 2 is a diagram illustrating an example programmable global clock generator 200 used in the clock circuit 120 of FIG. 1, according to various embodiments. Refer to FIG. 3 for example locations of global clock generator blocks 320-326 within the clock circuit 120 of FIG. 1.

Each of the clock generator modules 132-138 shown in FIG. 1 may receive inputs from multiple (e.g., four) global clock generators 200. The global clock generator 200 may comprise a phase-locked loop (PLL) 210, input multiplexers 240 and 250, and programmable clock counters 260. The PLL 210 may generate one or more output signals which can be locked to the reference clock input 230 (e.g., having the same frequency and a fixed-phase relationship). The multiplexer 240 may programmably select the feedback input 220 of the PLL 210 from input clocks 242. The input clocks 242 may come from other global clock generators (e.g., global clock generator blocks 320-326 shown in FIG. 3) or global clock input buffers 310, 312, 314, and 316 of FIG. 3.

The multiplexer 250 may programmably select the reference clock input 230 from the reference clocks 252 and 254. The reference clocks 252 and 254 may comprise a number of clock signals from other global clock generators (e.g., global clock generator blocks 320-326 shown in FIG. 3). The reference clocks 254 may comprise multiple clock signals originating from global clock input buffers (e.g., global clock input buffers 310-316 of FIG. 3). The output clocks from the PLL 210 may dynamically step through multiple sequential phases. The optional programmable clock counters 260 may programmably divide the frequency of the output clocks. The clocks generated by the programmable clock counters 260 can be phase aligned with the clock outputs of the PLL 210.

FIG. 3 is a diagram illustrating example locations of global clock generator blocks 320-326 and global clock input buffers 310-316 within the clock circuit 120 of FIG. 1, according to various embodiments. At each corner of the clock circuit 120 surrounding the core circuit 110 are shown the global clock generators 320, 322, 324, and 326. Each global clock generator block (e.g., global clock generator block 320) may provide clock signals (e.g., up to 16 clock signals) for a corresponding clock generator module (e.g., clock generator module 132 of FIG. 1)

Each of global clock input buffers 310-316 located at a corner (e.g., the SW corner) of the core circuit 110 may drive reference clocks for any one of the global clock generators located on the same corner. For example, the global clock input buffers 310 may provide reference clocks to a global clock generator of the global clock generator block 320. In an embodiment, one output of each of the global clock generator blocks 320, 322, 324, 326 at each corner of the core circuit 110 may be driven off the clock circuit 120 via one of the global clock buffers 310, 312, 314, 316 located at the same corner. The global clock buffers 310-316 may receive clock signals from sources outside the clock circuit 120 and the core circuit 110. Global clock generators within each global clock generator block (e.g., global clock generator block 320) may form a cascade of global clock generators.

Figure 4:
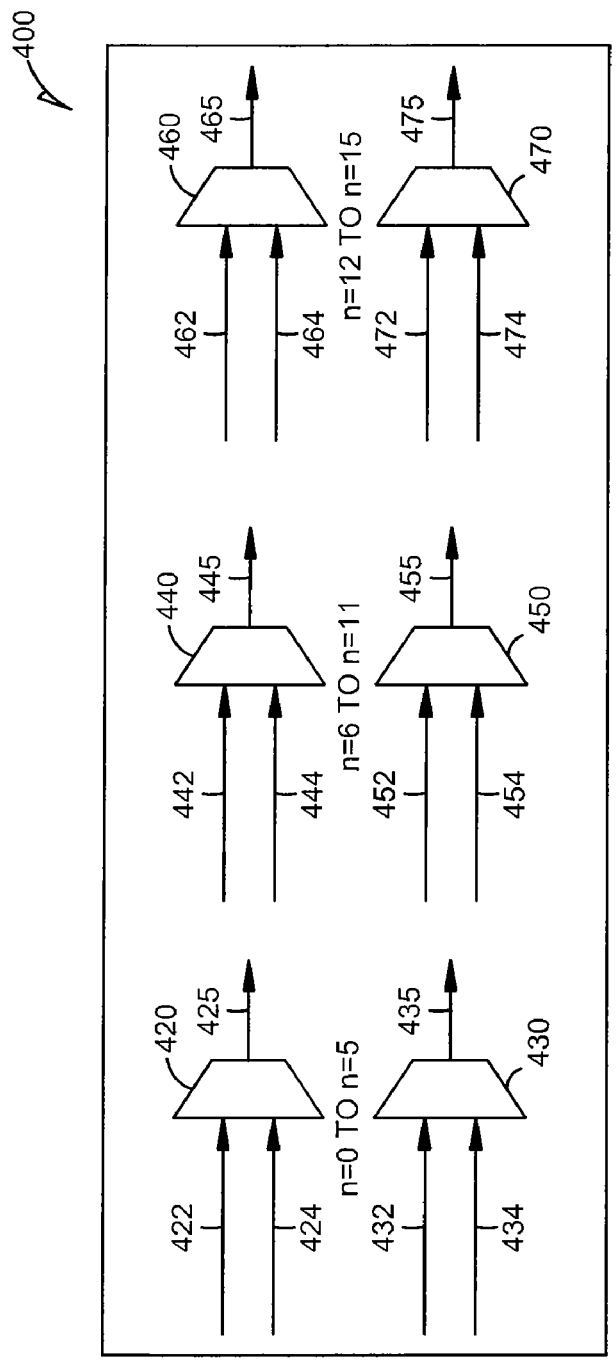
FIG. 4 is a diagram illustrating an example global clock module used in the clock circuit of FIG. 1, according to various embodiments.

FIG. 4 is a diagram illustrating an example global clock module 400 used in the clock circuit of FIG. 1, according to various embodiments. The global clock module 400 my represent one of the global clock modules 132-136 shown in FIG. 1. The global clock module 400 may be driven by the global clock generators (e.g., global clock generator block 320-326 of FIG. 3) or global clock input buffers (global clock input buffers 310-316 of FIG. 3). Multiplexers 420-470 shown in FIG. 4 may operate to programmably select inputs from the global clock generators or global clock input buffers to drive the output clock signals 425-475.

The multiplexers 420 and 430 each may represent a group of six multiplexers (e.g., n=0 to n=5) that each receive input signals 422 and 432 from one of the six global clock input buffers (e.g., global clock input buffer 310 of FIG. 3, for the case of clock generator module 132 of FIG. 1) or input signals 424 and 434 from one of the sixteen clock generator modules (e.g., any of the global clock generators within the global clock generator blocks 320-326).

Similarly, the multiplexers 440 and 450 each may represent a group of six multiplexers (e.g., n=6 to n=11) that each receive input signals 442 and 452 from one of the six global clock input buffers (e.g., global clock input buffers 310 of FIG. 3, for the case of clock generator module 132 of FIG. 1) or input signals 444 and 454 from one of the sixteen clock generator modules (e.g., of any of the global clock generators within the global clock generator blocks 320-326).

Finally, the multiplexers 460 and 470 each may represent a group of four multiplexers (e.g., n=12 to n=16) that each receive input signals 462 and 472 from one of four of the global clock input buffers (e.g., four of the global clock input buffers 310-316 of FIG. 3, for the case of clock generator module 132 of FIG. 1) or input signals 464 and 474 from one of the sixteen clock generator modules (e.g., of any of the global clock generators within the global clock generator blocks 320-326).

In an embodiment, the multiplexers 420, 440 and 460 may drive output clock signals 425, 445, and 465 to one of the first clock modules (e.g., the first clock module 142 of FIG. 1). The multiplexers 430, 450 and 470 may drive output clock signals 435, 455, and 475 to one or more of the third clock modules (e.g., the third clock module 164 of FIG. 1). In other embodiments, the number and arrangement of inputs and outputs of the multiplexers forming the global clock module 400 may be different from the example shown in FIG. 4.

Figure 5:
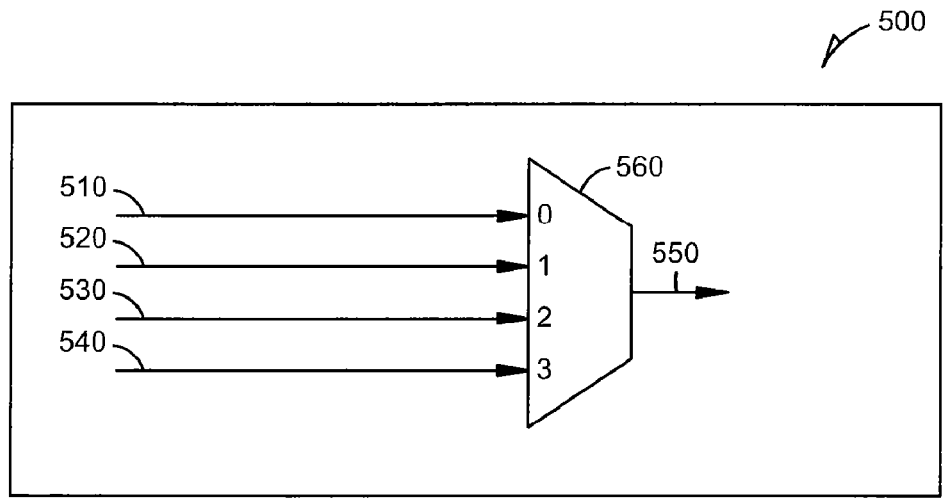
FIG. 5 is a diagram illustrating an example first clock module multiplexer used in a first clock module of the clock circuit of FIG. 1, according to various embodiments.

FIG. 5 is a diagram illustrating an example first clock module multiplexer 500 used in a first clock module of the clock circuit 120 of FIG. 1, according to various embodiments. As shown by the multiplexer 500 in FIG. 5, any of the first clock modules 142-146 of FIG. 1 may comprise a number of multiplexers (e.g., sixteen multiplexers). The first clock module multiplexer 500 may comprise a multiplexer element 560 that receives multiple (e.g., four) input clock signals 510-540 to drive an output clock signal 550. The input clock signals 510 and 530 may come from one of the clock generator modules (e.g., 132 in the case of first clock module 142). Input clock signals 520 and 540 may be received from another clock generator module (e.g., 136 in the case of first clock module 142). The output clock signal 550 may form a part of the second set of clock signals, discussed with respect to FIG. 1, to drive one or two of the second clock modules (e.g., the second clock module 152 of FIG. 1).

Figure 6:
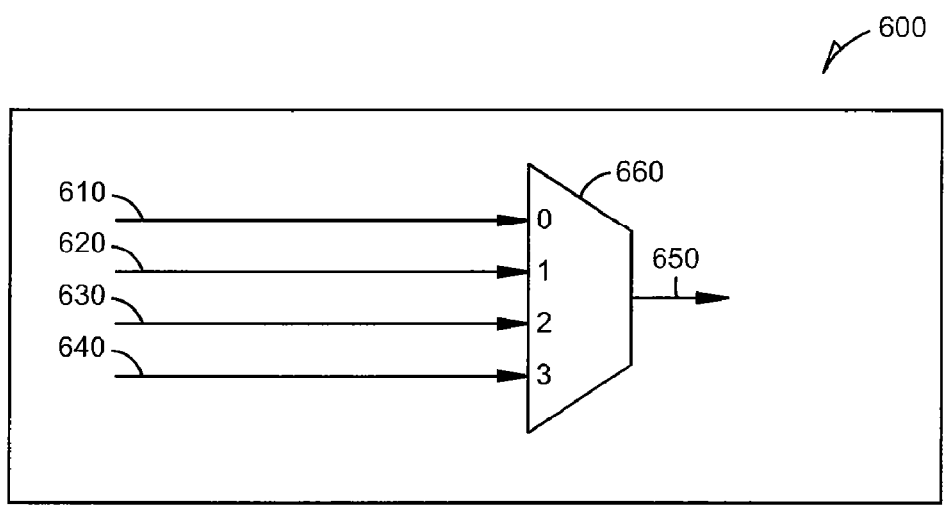
FIG. 6 is a diagram illustrating an example second clock module multiplexer used in a second clock module of the clock circuit of FIG. 1, according to various embodiments.

FIG. 6 is a diagram illustrating an example second clock module multiplexer 600 used in a second clock module of the clock circuit 120 of FIG. 1, according to various embodiments. As shown by the multiplexer 600 in FIG. 6, any of the second clock modules 152-156 of FIG. 1 may comprise a number of multiplexers (e.g., sixteen multiplexers). The second clock module multiplexer 600 may comprise a multiplexer element 660 that receives multiple (e.g., four) input clock signals 610-640 to drive an output clock signal 650. The input clock signals 610 and 630 may come from one of the first clock generator modules (e.g., 142 in the case of second clock module 152). Input clock signals 620 and 640 may be received from another clock generator module (e.g., 144 in the case of second clock module 152). The output clock signal 650 may form a part of the third set of clock signals, discussed above with respect to FIG. 1, to drive one of the third clock modules (e.g., the third clock module 162 of FIG. 1).

Figure 7:
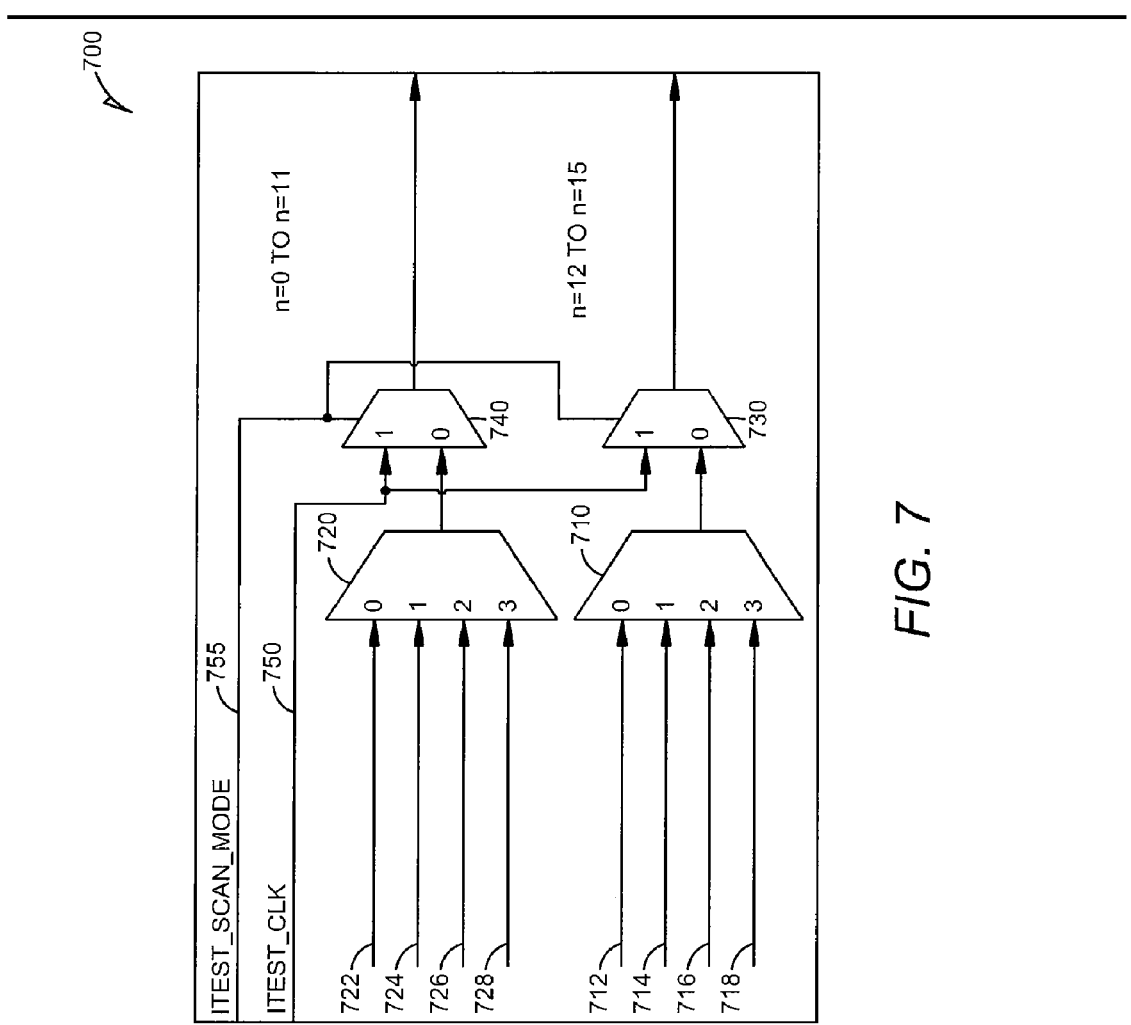
FIG. 7 is a diagram illustrating example third clock module multiplexers used in a third clock module of the clock circuit of FIG. 1, according to various embodiments.

FIG. 7 is a diagram illustrating example third clock module multiplexers 700 used in a third clock module of the clock circuit 120 of FIG. 1, according to various embodiments. Coupled to I/O ports of each I/O bank (e.g., the I/O banks 114 and 115 of FIG. 1) of the core circuit 110 is a third clock module. Each of the third clock modules (e.g., the third clock module 162) may receive multiple (e.g., sixteen) clock inputs from one of the second clock modules (e.g., the second clock module 152). The third clock module multiplexers 700 may comprise multiplexer elements 710, 720, 730, and 740. The multiplexer elements 710 and 720 each receive multiple (e.g., four) clock inputs (forming part of the third set of clock signals discussed above with respect to FIG. 1). The clock inputs 722, 726, 712, and 716 may be received from one of the second clock modules (e.g., the second clock module 152).

In an example embodiment, the multiplexer elements 710 and 720 may receive clock signals 724, 728, 714, and 718 from a nearby global clock module (e.g., the clock generator module 134 of FIG. 1). The multiplexer elements 730 and 740 may be used to select the test clock 750 and test scan signal 755 during test mode and scan modes, respectively. The multiple (e.g., sixteen) clock outputs of the third clock module multiplexers 700 may be distributed to I/O ports of one of the I/O banks of the core circuit 110 (e.g., I/O bank 114) using balanced, low skew clock networks. A low skew clock network may generate and distribute clock signals with skews less than a predefined value, for example less than 5% of the clock cycle duration of a clock signal such as clock signal of the first set of clock signals.

Figure 8:
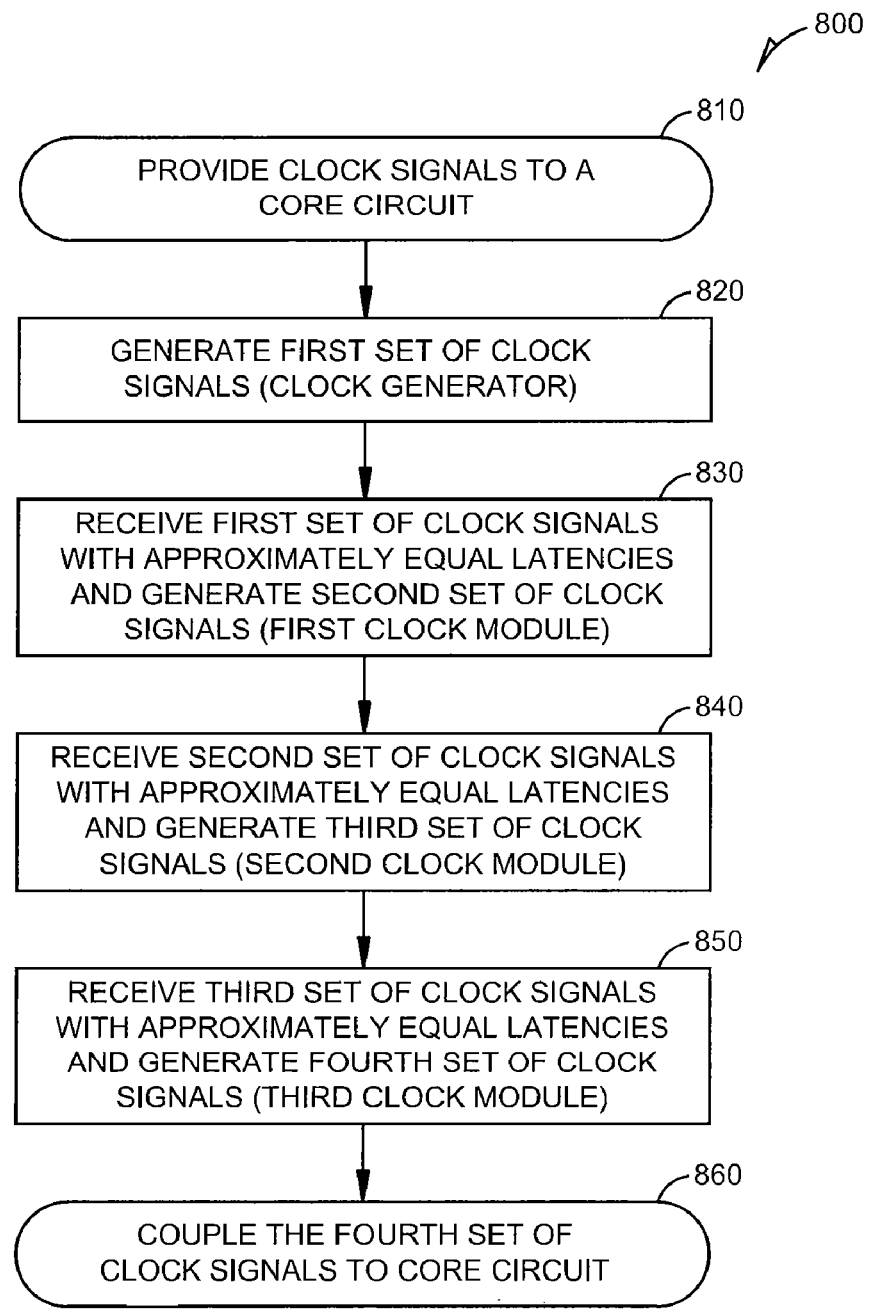
FIG. 8 is a diagram illustrating an example method implementing operations of the clock circuit of FIG. 1, according to various embodiments.

FIG. 8 is a diagram illustrating an example method 800 implementing operations of the clock circuit 120 of FIG. 1, according to various embodiments. At operation 810, the clock circuit 120 of FIG. 1 may distribute multiple clock signals with approximately equal latencies ("balanced clocks") to I/O ports of the I/O banks of the core circuit 110 as described below with respect to operations 820 through 860.

At operation 820, the clock generator modules 132-136 of FIG. 1 may generate a first set of clock signals as discussed above with respect to FIGS. 3 and 4. At operation 830, the first clock modules (e.g., the first clock modules 142 and 144 of FIG. 1) may receive the first set of clock signals from one or more of the clock generator modules (e.g., clock generator modules 132-138 of FIG. 1). Upon arrival at the first clock modules 142 and 144, the first set of clock signals may have approximately equal latencies. The first clock modules 142 and 144 may generate the second set of clock signals as discussed with respect to FIG. 5.

At operation 840, the second clock modules (e.g., the second clock modules 152 and 154 of FIG. 1) may receive the second set of clock signals. The position of the second clock modules 152 and 154 with respect to first clock modules 142 and 144 are such that the second set of clock signals experience approximately equal latencies. The second clock modules 152 and 154 may generate the third set of clock signals as described above with respect to FIG. 6.

At operation 850, the third clock modules (e.g., the third clock modules 162 and 164 of FIG. 1) may receive the third set of clock signals. The position of the third clock modules 162 and 164 with respect to the second clock modules 152 and 154 are such that the third set of clock signals experience approximately equal latencies. The third clock modules 162 and 164 may generate the fourth set of clock signals as described above with respect to FIG. 7.

At operation 860, the fourth set of clock signals generated by the third clock modules 162 and 164 may be distributed by a balanced, low skew clock network between the I/O ports of the I/O banks 114 and 115 of the core circuit 110 of FIG. 1.

Figure 9:
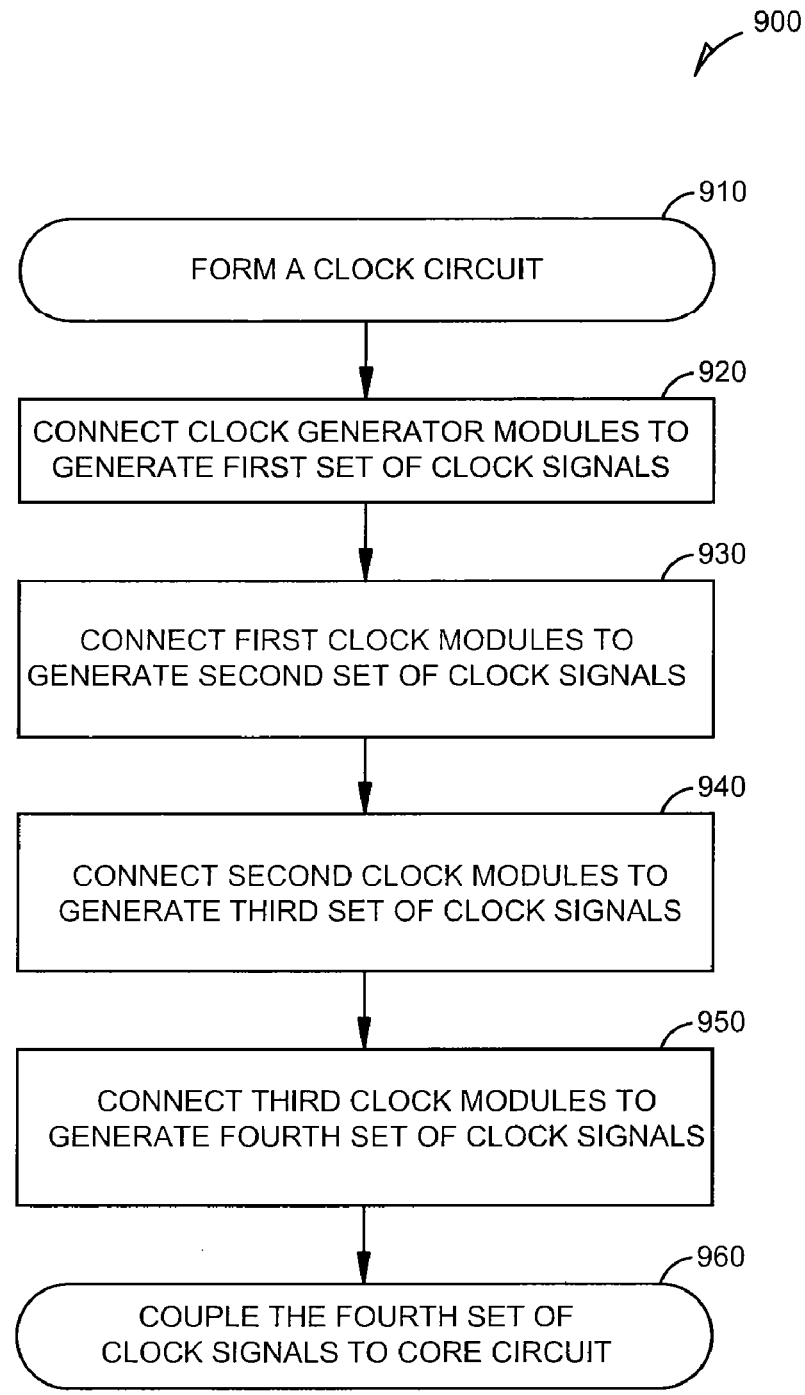
FIG. 9 is a diagram illustrating an example method of forming of the clock circuit of FIG. 1, according to various embodiments.

FIG. 9 is a diagram illustrating an example method 900 of forming of the clock circuit 120 of FIG. 1, according to various embodiments. At operation 910, the clock circuit 120 of FIG. 1 may be formed to distribute multiple clock signals with approximately equal latencies ("balanced clocks") to I/O ports of the I/O banks of the core circuit 110 as described below with respect to operations 920 through 960.

At operation 920, the clock generator modules 132-136 of FIG. 1 may be connected to generate a first set of clock signals as discussed above with respect to FIGS. 3 and 4. At operation 930, the first clock modules (e.g., the first clock modules 142 and 144 of FIG. 1) may be connected to receive the first set of clock signals from one or more of the clock generator modules (e.g., clock generator modules 132-138 of FIG. 1). Upon arrival at the first clock modules 142 and 144, the first set of clock signals may have approximately equal latencies. The first clock modules 142 and 144 may generate the second set of clock signals as discussed with respect to FIG. 5.

At operation 940, the second clock modules (e.g., the second clock modules 152 and 154 of FIG. 1) may be connected to receive the second set of clock signals. The position of the second clock modules 152 and 154 with respect to first clock modules 142 and 144 are such that the second set of clock signals experience approximately equal latencies. The second clock modules 152 and 154 may generate the third set of clock signals as described above with respect to FIG. 6.

At operation 950, the third clock modules (e.g., the third clock modules 162 and 164 of FIG. 1) may be connected to receive the third set of clock signals. The position of the third clock modules 162 and 164 with respect to the second clock modules 152 and 154 are such that the third set of clock signals experience approximately equal latencies. The third clock modules 162 and 164 may generate the fourth set of clock signals as described above with respect to FIG. 7.

At operation 960, the fourth set of clock signals generated by the third clock modules 162 and 164 may be coupled by a balanced, low skew clock network to the I/O ports of the I/O banks 114 and 115 of the core circuit 110 of FIG. 1.

Figure 10:
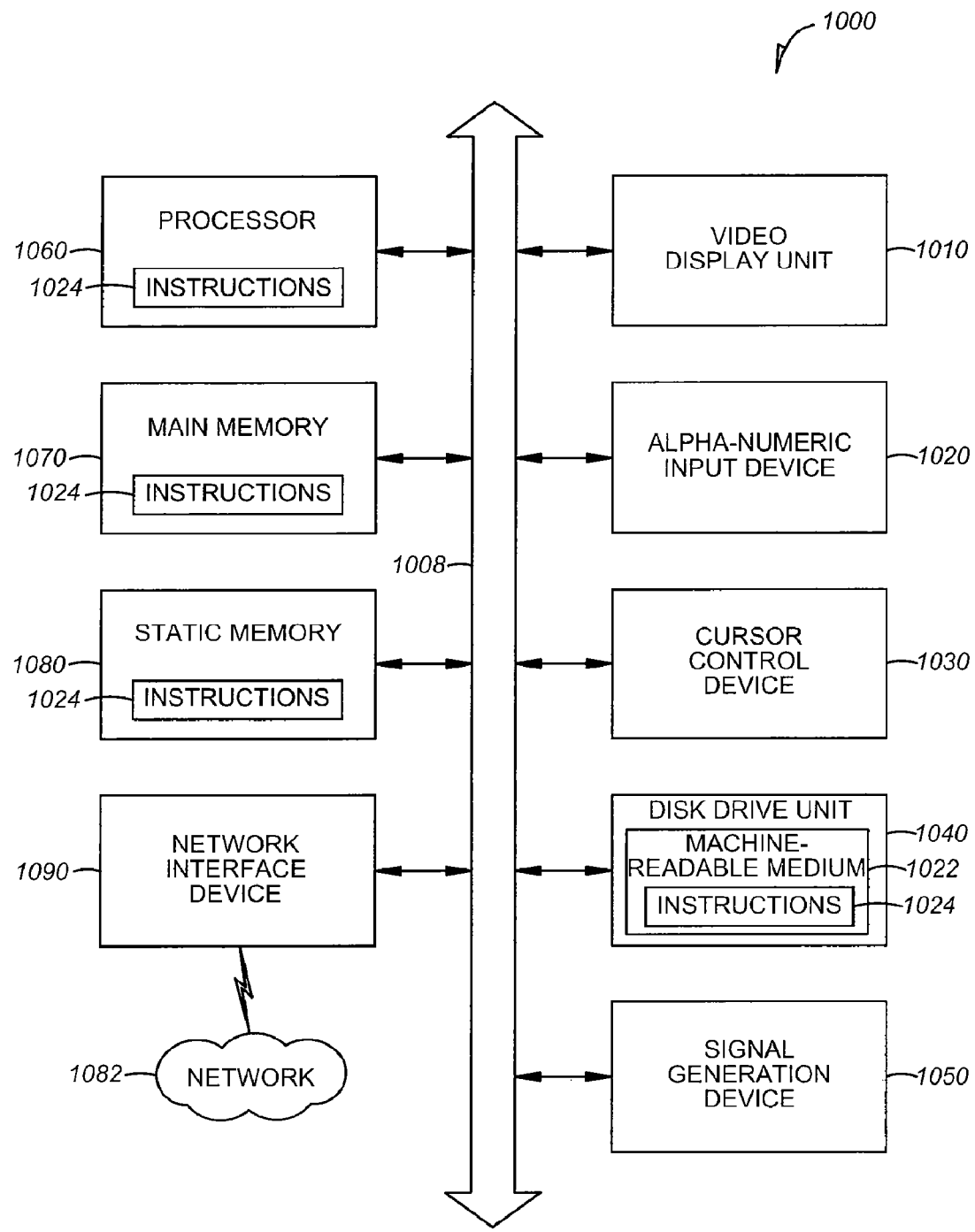
FIG. 10 is a diagram illustrating a system according to various embodiments.

FIG. 10 shows a diagram illustrating a system 1000, according to various embodiments. The system 1000 may comprise a set of instructions that can be executed to cause the system 1000 to perform any one or more of the methodologies discussed herein. In alternative embodiments, the system 1000 may operate as a standalone device or may be connected (e.g., networked) to other systems. In a networked deployment, the system 1000 may operate in the capacity of a server or a client system in a server-client network environment or as a peer system in a peer-to-peer (or distributed) network environment. System 1000 may be realized as a specific machine in the form of a computer.

The system 1000 may comprise a server computer, a client computer, a personal computer (PC), a tablet PC, an asynchronous FPGA, or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The example system 1000 may include the processor 1060 (e.g., a central processing unit (CPU), a graphics processing unit (GPU) or both), a main memory 1070 and a static memory 1080, all of which communicate with each other via a bus 1008. The system 1000 may further include a video display unit 1010 (e.g., a liquid crystal display (LCD) or cathode ray tube (CRT)). The system 1000 also may include an alphanumeric input device 1020 (e.g., a keyboard), a cursor control device 1030 (e.g., a mouse), a disk drive unit 1040, a signal generation device 1050 (e.g., a speaker), and a network interface device 1090.

The disk drive unit 1040 may include a machine-readable medium 1022 on which may be stored one or more sets of instructions (e.g., software) 1024 embodying any one or more of the methodologies or functions described herein. The instructions 1024 may also reside, completely or at least partially, within the main memory 1070 and/or within the processor 1060 during execution thereof by the system 1000, with the main memory 1070 and the processor 1060 also constituting machine-readable media. The instructions 1024 may further be transmitted or received over a network 1082 via the network interface device 1090.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any one or more of the methodologies of the present technology. The term "machine-readable medium" shall accordingly be taken to include, but not be limited to, tangible media, including solid-state memories and optical and magnetic media.

Various embodiments for forming and operating a global hierarchical clock tree have been described. The embodiments may provide balanced clock signals to I/O banks of a core circuit that may not have internal clock tree. Although example embodiments have been described, it will be evident, after reading this disclosure, that various modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. An integrated circuit comprising:
   a clock circuit configured to provide clock signals to a core circuit, the clock circuit comprising:
   a plurality of clock-generator modules configured to generate a plurality of first-level clock signals; and
   a hierarchy of clock modules arranged in one or more levels including a first level, each level including a plurality of clock modules that are each configured to receive at least one clock signal corresponding to that level and to generate at least one next-level clock signal, and the clock modules at each level being arranged to provide approximately equal latencies for the next-level clock signals at that level.

2. The integrated circuit of claim 1, wherein the one or more levels include the first level and a second level, the first-level clock modules providing second-level clock signals as inputs to the second-level clock modules.

3. The integrated circuit of claim 1, wherein the clock circuit substantially surrounds the core circuit, and the core circuit receives at least two clock signals from at least two levels in the hierarchy of clock modules.

4. The integrated circuit of claim 1, wherein the core circuit includes an asynchronous circuit.

5. The integrated circuit of claim 1, wherein each clock-generator module is located proximate to a corner of the core circuit.

6. The integrated circuit of claim 1, wherein each first-level clock module receives first-level clock signals from two clock-generator modules that are located at approximately equal distances from that first-level clock module.

7. The integrated circuit of claim 1, wherein
   the one or more levels include the first level and a second level,
   each first-level clock module receives first-level clock signals from two clock-generator modules that are located at approximately equal distances from that first-level clock module, and
   each second-level clock module receives second-level clock signals from two first-level clock modules that are located at approximately equal distances from that second-level clock module.

8. The integrated circuit of claim 1, wherein each clock-generator module includes a global clock generator.

9. The integrated circuit of claim 1, wherein each clock-generator module includes a phase-locked loop (PLL) that has output nodes connected to a plurality of programmable clock dividers.

10. A method of providing clock signals to a core circuit, the method comprising:
    generating, by a plurality of clock-generator modules, a plurality of first-level clock signals; and
    receiving, by a modular clock hierarchy comprising one or more levels including a first level, clock signals corresponding to each level and generating a plurality of corresponding next-level clock signals, each level including a plurality of clock modules that are each configured to receive at least one clock signal corresponding to that level and to generate at least one next-level clock signal, and the clock modules at each level being arranged to provide approximately equal latencies for the next-level clock signals at that level.

11. The method of claim 10, wherein the one or more levels include the first level and a second level, the first-level clock modules providing second-level clock signals as inputs to the second-level clock modules.

12. The method of claim 10, wherein the clock circuit substantially surrounds the core circuit, and the core circuit receives at least two clock signals from at least two levels in the hierarchy of clock modules.

13. The method of claim 10, wherein the core circuit includes an asynchronous circuit.

14. The method of claim 10, wherein each clock-generator module is located proximate to a corner of the core circuit.

15. The method of claim 10, wherein each first-level clock module receives first-level clock signals from two clock-generator modules that are located at approximately equal distances from that first-level clock module.

16. The method of claim 10, wherein
the one or more levels include the first level and a second level,
each first-level clock module receives first-level clock signals from two clock-generator modules that are located at approximately equal distances from that first-level clock module, and
each second-level clock module receives second-level clock signals from two first-level clock modules that are located at approximately equal distances from that second-level clock module.

17. The method of claim 10, wherein each clock-generator module includes a global clock generator.

18. The method of claim 10, wherein each clock-generator module includes a phase-locked loop (PLL) that has output nodes connected to a plurality of programmable clock dividers.

19. A non-transitory machine-readable medium that stores instructions, that when executed by a machine cause the machine to perform operations for providing clock signals to a core circuit, the operations comprising:
generating, by a plurality of clock-generator modules, a plurality of first-level clock signals; and
receiving, by a modular clock hierarchy comprising one or more levels including a first level, clock signals corresponding to each level and generating a plurality of corresponding next-level clock signals, each level including a plurality of clock modules that are each configured to receive at least one clock signal corresponding to that level and to generate at least one next-level clock signal, and the clock modules at each level being arranged to provide approximately equal latencies for the next-level clock signals at that level.

* * * * *